US006615581B2

(12) United States Patent
Kusuyama

(10) Patent No.: US 6,615,581 B2
(45) Date of Patent: Sep. 9, 2003

(54) HYDRAULIC OIL FLOW CONTROLLER FOR CONSTRUCTION MACHINE

(75) Inventor: Yasuhiro Kusuyama, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/022,277

(22) Filed: Dec. 20, 2001

(65) Prior Publication Data

US 2002/0083825 A1 Jul. 4, 2002

(30) Foreign Application Priority Data

Dec. 28, 2000 (JP) .......................................... 2000-400696

(51) Int. Cl.[7] ................................................ F16D 31/02

(52) U.S. Cl. ............................. 60/328; 60/422; 60/468; 60/486

(58) Field of Search .......................... 60/328, 421, 422, 60/461, 468, 486

(56) References Cited

U.S. PATENT DOCUMENTS 5,692,376 A * 12/1997 Miki et al. .................... 60/328

FOREIGN PATENT DOCUMENTS

JP 08270021 A * 10/1996 ............. E02F/9/22
JP 09235759 A * 9/1997 ............. E02F/9/22
JP 2002115274 A * 4/2002 ............. E02F/9/22

* cited by examiner

*Primary Examiner*—Edward K. Look
*Assistant Examiner*—Thomas E. Lazo
(74) *Attorney, Agent, or Firm*—Varndell & Varndell, PLLC

(57) ABSTRACT

A hydraulic oil flow controller for a construction machine comprises an operating valve 6 for supplying hydraulic oil discharged from hydraulic pimps 1 and 2 to an attachment, an attachment operating unit 11 for transmitting a pilot signal corresponding to the manipulated variable of the operating valve 6 and a solenoid control valve 12 for changing the flow characteristics of the pilot signal in accordance with a command from a controller 19. An increase and/or decrease signal is sent to the solenoid control valve 12 through the controller 19 from a monitor device 18 so that the flow of the hydraulic oil supplied to the actuator of the attachment is increased and/or decreased. Accordingly, a coefficient of fluctuation of the flow relative to a coefficient of fluctuation of the manipulated variable can be decreased in the work of the attachment of a hydraulic shovel and the operation efficiency upon operation of the attachment can be improved.

7 Claims, 6 Drawing Sheets

HYDRAULIC OIL FLOW CONTROLLER FOR CONSTRUCTION MACHINE

BACKGROUND OF THE INVENTION

1. Field of the Invention

The present invention relates to a hydraulic oil flow controller for a construction machine such as a hydraulic shovel, and more particularly to a hydraulic oil flow controller for a construction machine which controls the hydraulic oil flow suitable for the attachment work of a hydraulic shovel.

2. Description of the Related Art

FIG. 6 schematically shows the entire body of a hydraulic shovel 45. The hydraulic shovel 45 comprises a lower travelling body 45, an upper swing body 47 mounted thereon so as to freely swing, a rotary boom 48 extending forward from the upper swing body 47, a rotary arm 49 attached to the end of boom 48 and a rotary bucket 51 attached to the end of the arm 49. A drilling work by using the hydraulic shovel 45 is ordinarily carried out by manipulating an operating lever arranged in an operating room by an operator. The operator manipulates the operating lever so that hydraulic oil from a hydraulic pump flows out from an operating valve in accordance with the manipulated variable or the control input of the operating lever. The hydraulic oil flowing out from the operating valve is supplied to a main actuator. When the hydraulic oil is supplied to the main actuator, the actuator is driven and the drilling work is carried out. Further, the hydraulic shovel 45 can perform such operations as breaking or crushing works by attaching attachments such as a breaker or a crusher to the end of the arm in place of the bucket 51. The breaking or crushing work is carried out by operating an operating pedal disposed at the feet of the operator in the operating room.

The relation between a distance that the operating pedal is stepped on, which will be referred to simply as a distance hereinafter, and the flow or the flow rate of hydraulic oil flowing out from the operating valve in the prior art is of this sort that the flow is zero when the operating pedal is not stepped on, the flow is increased step by step as the operating pedal is gradually stepped on and the flow becomes maximum when the operating pedal is stepped on to its maximum. Accordingly, the flow is readily determined depending on the distance from the beginning of stepping on the operating pedal until the maximum distance of the operating pedal. Therefore, the relation between the distance of the operating pedal and the flow ordinarily shows a substantially linear relation.

The flow of hydraulic oil flowing out from the operating valve in the hydraulic shovel is preset to the value of flow necessary for driving the main actuator. The flow of a small attachment such as a simplex breaker necessary for driving the actuator is extremely less than the flow necessary for driving the main actuator. Accordingly, when the actuator of the small attachment is driven in accordance with the flow necessary for driving the main actuator, the maximum flow obtained when the operating pedal is stepped on at its maximum is excessively more than that necessary for driving the actuator of the small attachment. Therefore, in order to obtain the flow necessary for driving the actuator of the small attachment, the distance that the operating pedal is stepped on is decreased and the distance further needs to be increased or decreased so that it can be properly adjusted. However, since all the distance of the operating pedal when actuating the main actuator corresponds to the maximum flow which is excessively set relative to the flow required for driving the actuator of the small attachment, a coefficient of fluctuation of the flow relative to a coefficient of fluctuation of the distance of the operating pedal is undesirably large. Therefore, the flow is undesirably greatly fluctuated only by slightly increasing or decreasing the distance of the operating pedal. Accordingly, it has been very difficult to increase or decrease the distance of the operating pedal so that the distance is suitably adjusted to obtain a flow required for driving the actuator of the small attachment and the operation efficiency of the small attachment has been inconveniently deteriorated.

SUMMARY OF THE INVENTION

The present invention is proposed to overcome the above-described problems of the prior art and it is an object of the present invention to provide a hydraulic oil flow controller for a construction machine in which the coefficient of fluctuation of flow relative to the coefficient of fluctuation of a manipulated variable can be decreased and the operation efficiency of an attachment can be improved when the attachment is operated.

A hydraulic oil controller for a construction machine comprises an operating valve 6 for supplying hydraulic oil from hydraulic pumps 1 and 2 to the actuator of an attachment, an attachment operating unit 11 for transmitting a pilot signal corresponding to a manipulated variable or a control input to the operating valve 6 and a solenoid control valve 12 for changing the flow characteristics of the pilot signal in accordance with a command from a controller 19, wherein an increase and/or decrease signal is sent to the solenoid control valve 12 through the controller 19 from a monitor device 18 so that the flow of hydraulic oil supplied to the actuator of the attachment is increased and/or decreased and the flow determined by the increase and/or decrease signal is displayed on a monitor screen.

In the hydraulic oil flow controller for a construction machine according to a first embodiment, when a signal for decreasing the flow of discharged hydraulic oil is sent to the solenoid control valve 12 through the controller 19 from the monitor device 18, the flow characteristics of the pilot signal acting on the operating valve 6, for instance, pilot pressure is decreased. The pilot pressure is decreased, so that the flow of the hydraulic oil supplied to the actuator of the attachment can be decreased in accordance with the manipulated variable or the control input of the attachment operating unit and the coefficient of fluctuation of the flow relative to the coefficient of fluctuation of the manipulated variable of the attachment operating unit is decreased. Consequently, the operation efficiency of the attachment operating unit can be improved. Further, the flow of the hydraulic oil supplied to the actuator of the attachment is increased and/or decreased, and accordingly, an optimum flow can be preset to a different kind of attachment, the unnecessary exhaust loss of the flow can be reduced, a power efficiency can be raised and energy-saving can be achieved. Still further, the flow determined by increasing and/or decreasing the flow is displayed on the monitor screen. Thus, the set flow can be visually recognized and the operation efficiency can be improved.

Further, according to the hydraulic oil flow controller for a construction in a second embodiment, an increase and/or decrease signal is transmitted to the controller 19 by an increase and/or decrease switch provided in the monitor screen on in the vicinity thereof.

In the hydraulic oil flow controller for a construction machine as described in the second embodiment, since the increase and/or decrease switch for increasing and/decreasing the flow supplied to the actuator of the attachment is provided in the monitor screen or in the vicinity of the monitor screen, the switch for increasing and/or decreasing the flow of the hydraulic oil can be operated while viewing the monitor screen. Thus, the operation efficiency of the switch can be improved and the operation efficiency of a whole device can be improved.

Still further, the hydraulic oil flow controller for a construction machine as described in a third embodiment further comprises a flow separating and combining valve 3 for selectively switching the drive of a plurality of hydraulic pumps 1 and 2 and a single hydraulic pump 2 so that a select signal from a select switch is transmitted to the controller 19 by the attachment select switch and the flow separating and combining valve 3 is switched in accordance with a command from the controller 19.

Still further, in the hydraulic oil flow controller for a construction machine as described in the third embodiment, the driving of the plural hydraulic pumps 1 and 2 and the driving of the single hydraulic pump 2 are switched, so that the discharges of the plural hydraulic pumps 1 and 2 can be ensured so as to meet the attachment.

Still further, the hydraulic oil flow controller for a construction machine as described in a fourth embodiment further comprises a change-over valve 21 for selectively switching or changing over a single-acting hydraulic circuit and a double-acting hydraulic circuit, the change-over valve 21 being switched by the attachment select switch.

Furthermore, in the hydraulic oil flow controller for a construction machine as described in the fourth embodiment, since the single-acting hydraulic circuit and the double-acting hydraulic circuit can be selectively switched by the change-over valve 21, when an attachment driven by the single-acting hydraulic circuit is mounted on the machine, the circuit is switched to the single-acting hydraulic circuit so that the hydraulic oil flowing out from the actuator of the attachment is not returned to the first operating valve 6 from the change-over valve 21 and directly returned to a tank. Therefore, back pressure is lowered so that the attachment can be smoothly driven.

BRIEF DESCRIPTION OF THE DRAWINGS

FIG. 4(A) shows monitor screens when a work by a breaker is performed, and FIG. 4(B) shows monitor screens when a work by a crusher is performed.

DETAILED DESCRIPTION OF THE PREFERRED EMBODIMENT

Now, an embodiment of a hydraulic oil flow controller for a construction machine according to the present invention will be described in more detail by referring to the accompanying drawings.

Figure 1:
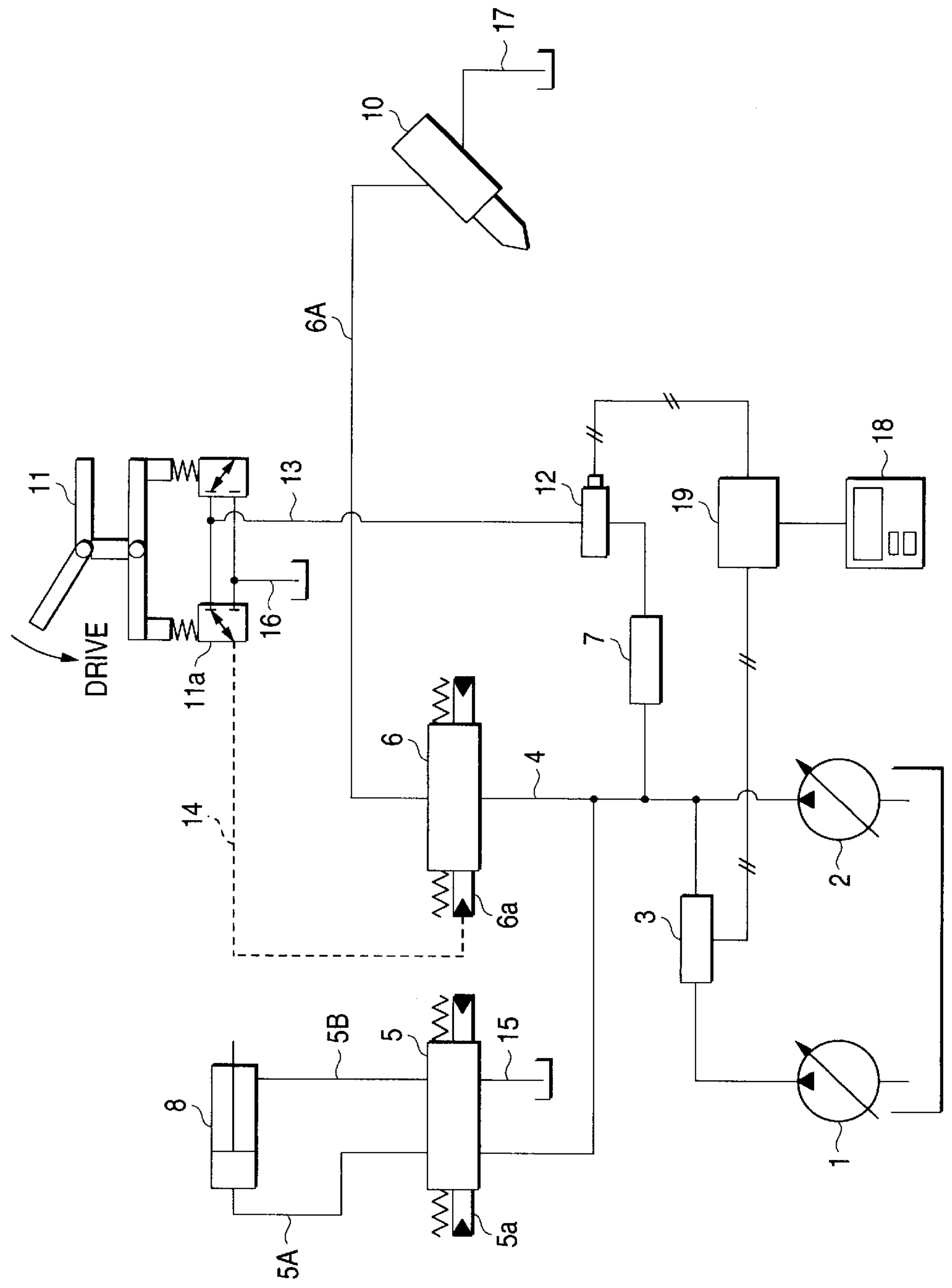
FIG. 1 is an operation circuit diagram when a breaker as an attachment is attached to a hydraulic shovel in a hydraulic oil flow controller for a hydraulic shovel.

Firstly, the constitution of an operation circuit of the hydraulic oil flow controller for a construction machine according to the present invention will be described. FIG. 1 shows the operation circuit when a breaker as an attachment is mounted on a hydraulic shovel in the hydraulic oil controller for the hydraulic shovel. The operation circuit includes a first hydraulic pump 1 and a second hydraulic pump 2. The first hydraulic pump 1 is combined with the second hydraulic pump 2 through a flow separating and combining valve 3 and is connected to a main discharge line 4. The main discharge line 4 branches and is connected to a first operating valve 5, a second operating valve 6 and a pressure reducing valve 7. The first operating valve 5 is connected to a working machine cylinder 8 as a main actuator through downstream pipelines 5A and 5B. An operating lever not shown is provided with a first pressure reducing part. The first pressure reducing part is connected to a first pilot chamber 5*a* of the first operating valve 5. The second operating valve 6 is connected to a breaker 10 through a first pipeline 6A. An operating pedal 11 is provided with a second pressure reducing part 11*a*. The pressure reducing valve 7 is connected to the second pressure reducing part 11*a* through a solenoid control valve 12 by a pilot pressure supply line 13. The second pressure reducing part 11*a* is connected to a second pilot chamber 6*a* of the second operating valve 6 through a first pilot pipeline 14. Pipelines 15, 16 and 17 are drain pipelines. A monitor device 18 is electrically connected to a controller 19. The controller 19 is electrically connected to the flow combining and separating valve 3 and the solenoid control valve 12.

Now, there will be described the operation of the operation circuit when the breaker 10 as an attachment is mounted on the construction machine in the hydraulic oil flow controller for a construction machine according to this embodiment of the present invention.

Firstly, the driving of the working machine cylinder 8 will be described below. When the working machine cylinder 8 is driven toward its extended side, the operating lever not shown is operated toward its extended side so that pilot pressure corresponding to a manipulated variable or a control input acts on the first pilot chamber 5*a* of the first operating valve 5. The opening of the first operating valve 5 is determined depending on the pilot pressure acting on the first pilot chamber 5*a*. Hydraulic oil branching from the main discharge line 4 is guided to the operating valve 5 and enters the working machine cylinder 8 through the pipeline 5A so that the working machine cylinder 8 is extended.

In the next place, the driving of the breaker 10 will be described below. When the breaker is driven, an amount of discharge obtained by switching or changing over one pump and/or two pumps as described below indicates that only of the second hydraulic pump 2. The hydraulic oil discharged from the second hydraulic pump 2 branches from the main discharge line 4 and the pressure of the hydraulic oil is reduced through the pressure reducing valve 7. The pressure reduced hydraulic oil is guided to the pilot pressure supply line 13 through the solenoid control valve 12. The pressure of the hydraulic oil guided to the pilot pressure supply line 13 is exerted on the second pressure reducing part 11*a* of the operating pedal 11. When the operating pedal 11 is stepped on, the pilot pressure corresponding to a distance got by stepping on the operating pedal is exerted on the second pilot chamber 6*a* through the first pilot pipeline 14 from the second pressure reducing part 11*a*. The opening of the second operating valve 6 is determined depending on the pilot pressure exerted on the second pilot chamber 6*a*. Thus, the hydraulic oil guided to the second operating valve 6 from the main discharge line 4 enters the actuator of the breaker 10 through the first pipeline 6A to drive the breaker 10. At this time, the relation between the distance of the operating pedal 11 and the flow of the hydraulic oil flowing out of the second operating valve 6 shows the relation of a linear function that the flow is readily determined dependent upon the distance of the operating pedal 11 and a coefficient of fluctuation of the flow relative to a coefficient of fluctuation of the distance of the operating pedal 11 indicates a prescribed inclination. Therefore, when the operating pedal 11 is stepped on to its maximum, the flow of the hydraulic oil to the breaker 10 reaches a maximum value.

Figure 2:
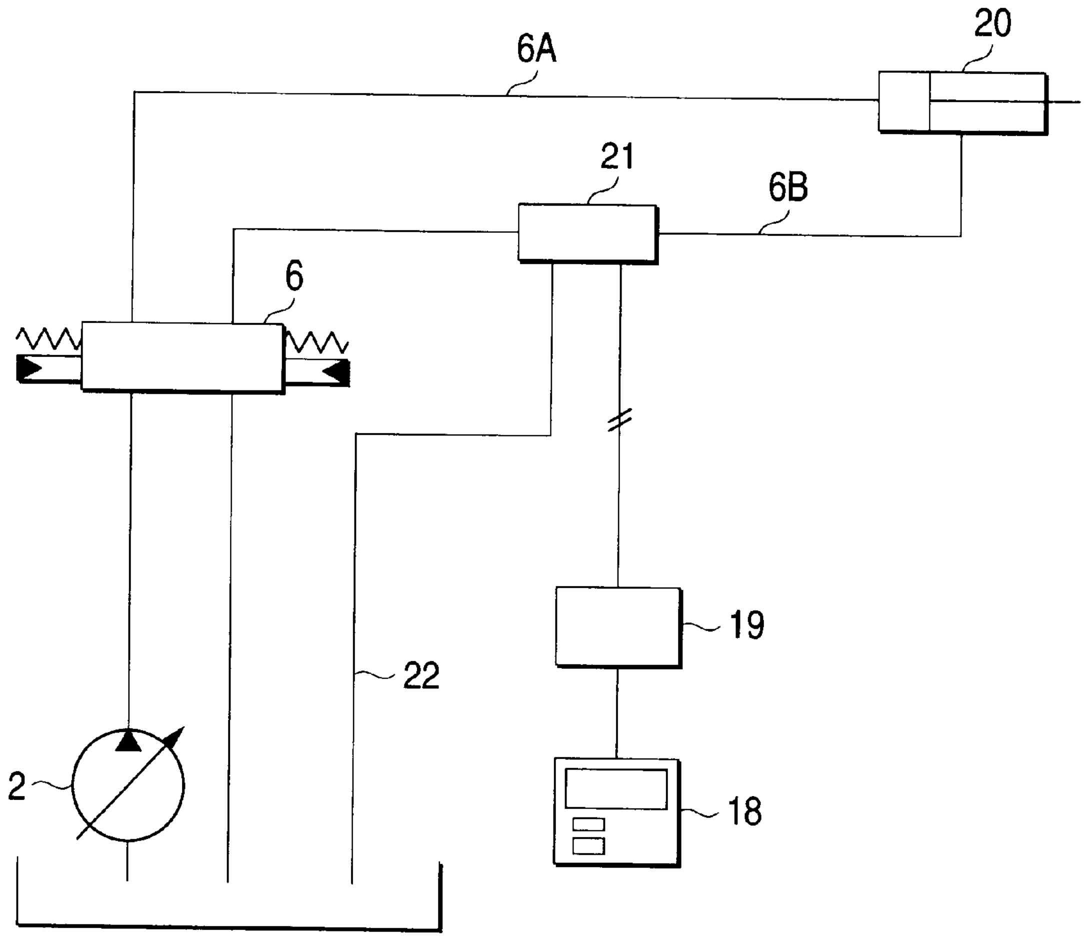
FIG. 2 is a changing-over circuit diagram for selectively switching a single-acting hydraulic circuit and a double-acting hydraulic circuit in the hydraulic oil flow controller.

The hydraulic oil flow controller further comprises a changing-over circuit for selectively switching or changing over a single-acting hydraulic circuit and a double-acting hydraulic circuit. The single-acting hydraulic circuit means a hydraulic circuit that the hydraulic oil usually enters from one port of the actuator and is discharged from the other port like the breaker 10. The double-acting hydraulic circuit means a hydraulic circuit that the inlet port and the outlet port of the actuator for the hydraulic oil are alternately switched or changed over like a crusher 20. FIG. 2 shows the changing-over circuit for selectively switching the single-acting hydraulic circuit and the double-acting hydraulic circuit in the hydraulic oil flow controller. Since components designated by the same reference numerals as those of FIG. 1 have the same constructions, the explanation thereof is omitted. The second operating valve 6 is connected to the inlet port and the outlet port of an actuator through the first pipeline 6A and a second pipe line 6B. Further, the second pipeline 6B is provided with a change-over valve 21. A pipeline 22 is a drain pipeline. The controller 19 is electrically connected to the change-over valve 21. When the crusher 20 is mounted on the construction machine, the hydraulic circuit becomes the double-acting hydraulic circuit that the hydraulic oil flowing out from the second operating valve 6 is supplied to the inlet port and the outlet port of the actuator which are alternately switched or changed over through the first pipeline 6A and the second pipeline 6B. When the breaker 10 is mounted on the construction machine, the change-over valve 21 is switched or changed over, so that the hydraulic circuit becomes the single-acting hydraulic circuit that the hydraulic oil flowing out from the second operating valve 6 enters the inlet port of the actuator through the first pipeline 6A and the hydraulic oil flowing out from the outlet port is discharged to a tank from the change-over valve 21 through the second pipeline 6B. When the breaker 10 is mounted on the construction machine, the change-over valve 21 is switched or changed over to switch or change over the hydraulic circuit to the single-acting hydraulic circuit, and accordingly, the hydraulic oil flowing out of the outlet port of the actuator is directly returned to the tank from the change-over valve 21 without passing through the second operating valve 6. Therefore, back pressure is lowered and the attachment can be smoothly driven.

Figure 3:
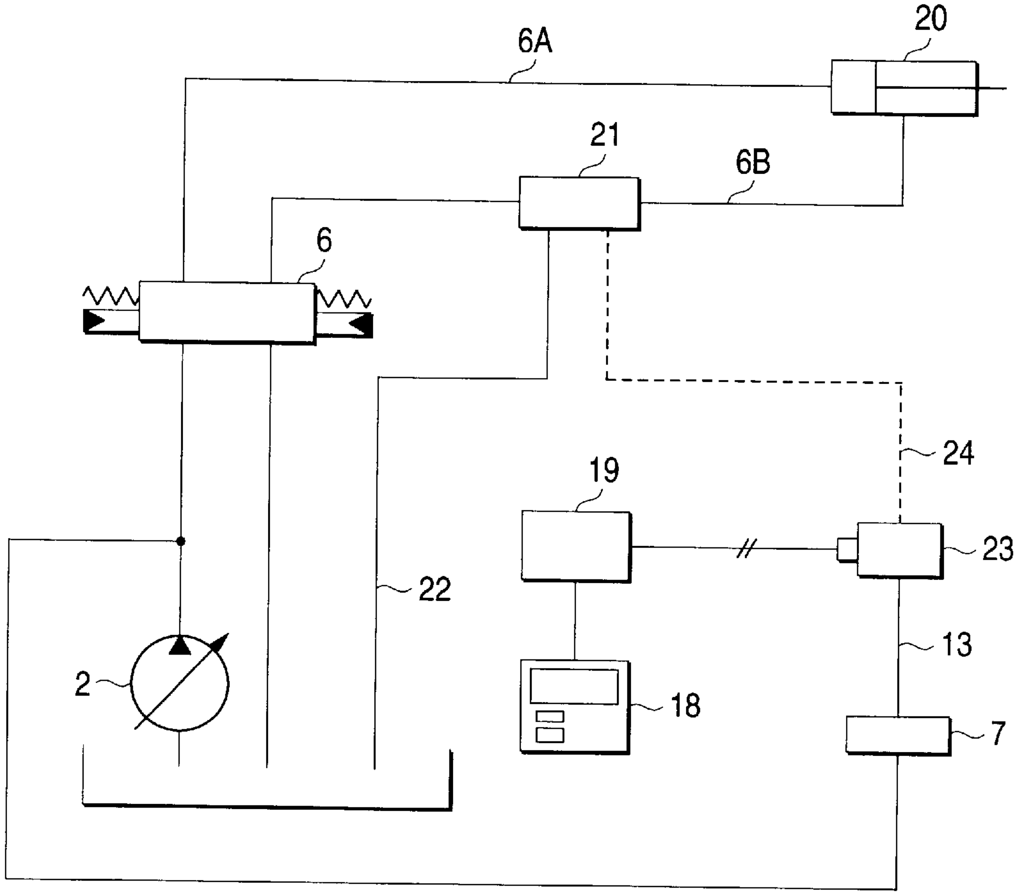
FIG. 3 is a changing-over circuit diagram for selectively switching the single-acting hydraulic circuit and the double-acting hydraulic circuit in the hydraulic oil flow controller.

Further, the changing-over circuit for selectively switching or changing over the single-acting hydraulic circuit and the double-acting hydraulic circuit in the hydraulic oil flow controller may be a changing-over circuit of a type as shown in FIG. 3. Now, the changing-over circuit for changing over a single-acting hydraulic circuit and a double-acting hydraulic circuit in the hydraulic oil flow controller as shown in FIG. 3 will be described below. Since components designated by the same reference numerals as those of FIGS. 1 and 2 have the same structures, the explanation thereof will be omitted. In this circuit, the pressure reducing valve 7 is connected to a solenoid valve 23 through the pilot pressure supply line 13. The solenoid valve 23 is connected to the change-over valve 21 through a second pilot pipeline 24. The controller 19 is electrically connected to the solenoid valve 23. When the crusher 20 is mounted on the construction machine, the hydraulic circuit becomes the double-acting hydraulic circuit. When the breaker 10 is mounted on the construction machine, the solenoid valve 23 is switched or changed over, hence pilot pressure is exerted on the change-over valve 21 through the second pilot pipeline 24. The change-over valve 21 is changed over under the pilot pressure acting on the change-over valve 21, so that the hydraulic circuit becomes the single-acting hydraulic circuit.

Figure 4:
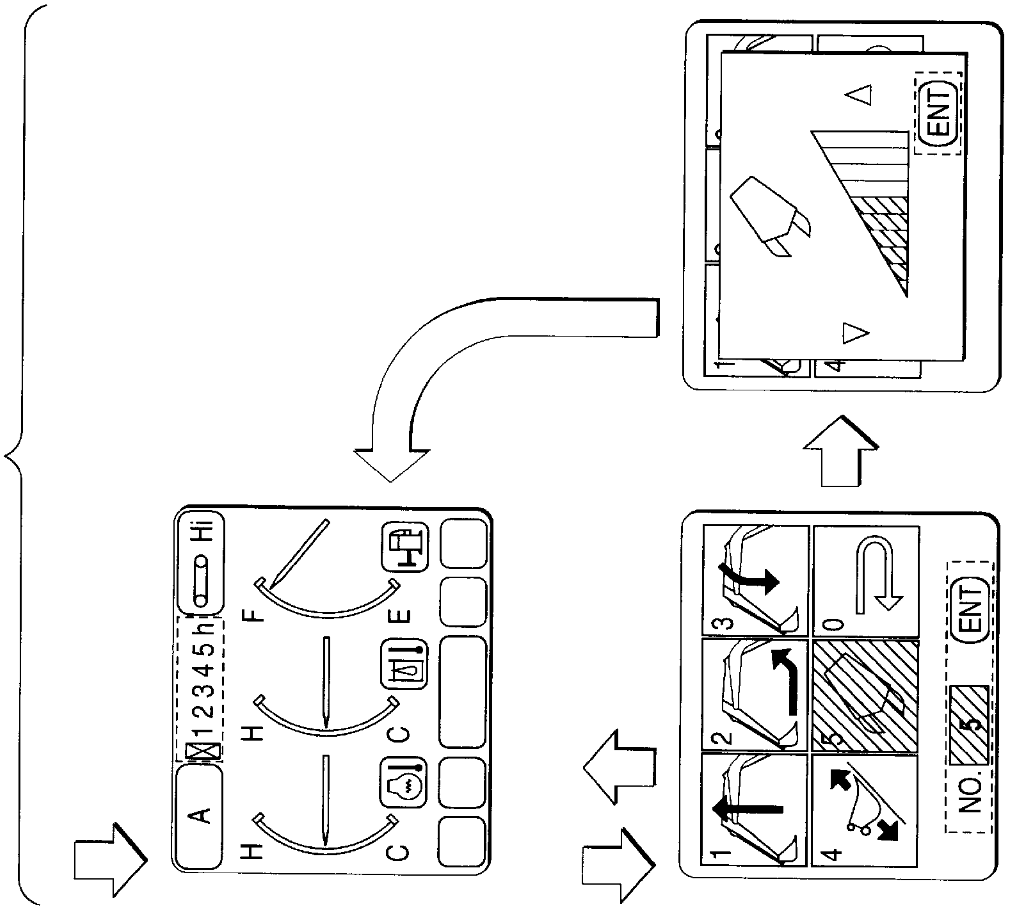
FIG. 4 shows monitor screens in a monitor device upon operation.
Figure 4:
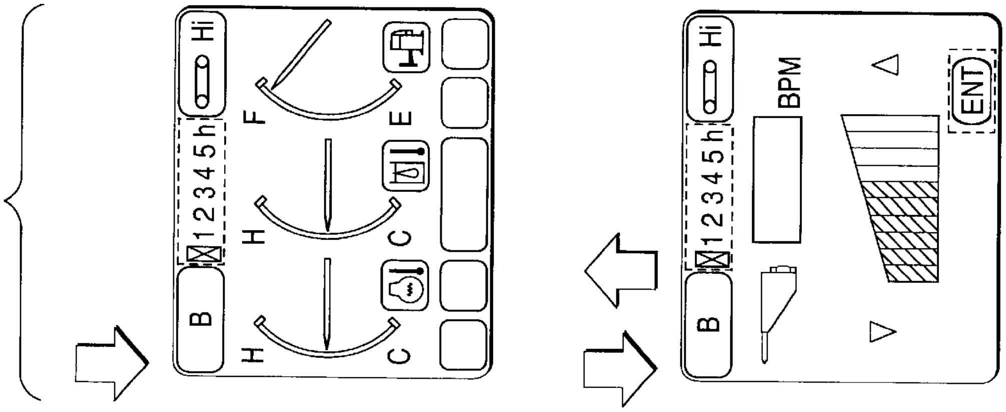

In the next place, there will be described the monitor device 18. The monitor device 18 is provided in an operating room. The monitor device 18 has a monitor screen, an attachment select switch, a select button, a determination button and an increase and/or decrease button. The attachment select switch, the select button, the determination button and the increase and/or decrease button are arranged on the monitor screen or in the vicinity thereof. On the monitor screen as an ordinary screen, the temperature of water of a hydraulic shovel, the temperature of hydraulic oil and residual fuel or the like are displayed as shown in FIG. 4. The attachment select switch can select a mode B or a mode A. The mode B is a mode when the work by the breaker is carried out. The mode A is a mode when a special kind of work and works of other attachments are carried out.

Now, the operation of the hydraulic oil flow controller according to the present embodiment will be described. The operation includes an operation for increasing and/or decreasing the maximum flow, a switching or changing-over operation of one pump and two pumps and a switching or changing-over operation for switching or changing-over the single-acting hydraulic circuit and the double-acting hydraulic circuit. FIG. 4 shows the monitor screens of the monitor device upon operation. FIG. 4(A) shows monitor screens when the work by using the breaker is carried out and FIG. 4(B) shows monitor screens when the work using by the crusher is carried out.

Firstly, the operation when the work by using the breaker is carried out is described below. When the work by the breaker is performed, the maximum flow obtained when the operating pedal is stepped on to its maximum distance is preset so as to be more greatly lower than that obtained when the work by the working machine cylinder 8 is carried out. That is, it is necessary to lower an inclination representing the relation between the distance of the operating pedal 11 and the flow and to decrease a coefficient of fluctuation of the flow relative to a coefficient of fluctuation of the distance of the operating pedal 11. Further, the flow required for the breaker 10 is different dependent on its manufacturer or its model. If the maximum flow is larger than the required flow, the exhaust loss of unnecessary flow will be increased. Therefore, it is necessary for a different kind of breaker 10 to preset a maximum flow so as to meet a necessary flow. Thus, the operation for increasing and/or decreasing the maximum flow when the work by the breaker is performed needs an operation for presetting the maximum flow to an extremely small value and a maximum flow increasing and/or decreasing operation by which the maximum flow is further increased and/or decreased step by step within the maximum flow preset to the small value.

Initially, the operation for presetting the maximum flow to an extremely small value is described below. The operating mode B is selected by the attachment select switch of the monitor device 18 in the operating room. B is displayed on the left and upper part of the monitor screen (see the upper monitor screen shown in FIG. 4(A)). A select signal is transmitted to the controller 19 from the monitor device. Then, a command is sent to the solenoid control valve 12 from the controller 19. Pressure guided to the pilot pressure supply line 13 is set to a very small value by the solenoid control valve 12. The pressure guided to the pilot pressure supply line 13 is pressure acting on the second pressure reducing part 11*a*. The pressure acting on the second pressure reducing part 11*a* is outstandingly lowered. Thus, pilot pressure exerted on the second pilot chamber 6*a* of the second operating valve 6 is also extremely lowered in proportion to the pressure exerted on the second pressure reducing part 11*a*, so that the opening of the second operating valve 6 corresponding to the distance of the operating pedal 11 is extremely decreased. Accordingly, the maximum flow obtained when the operating pedal 11 is stepped on to its maximum distance is greatly lower than the flow necessary for the working machine cylinder 8.

Figure 5:
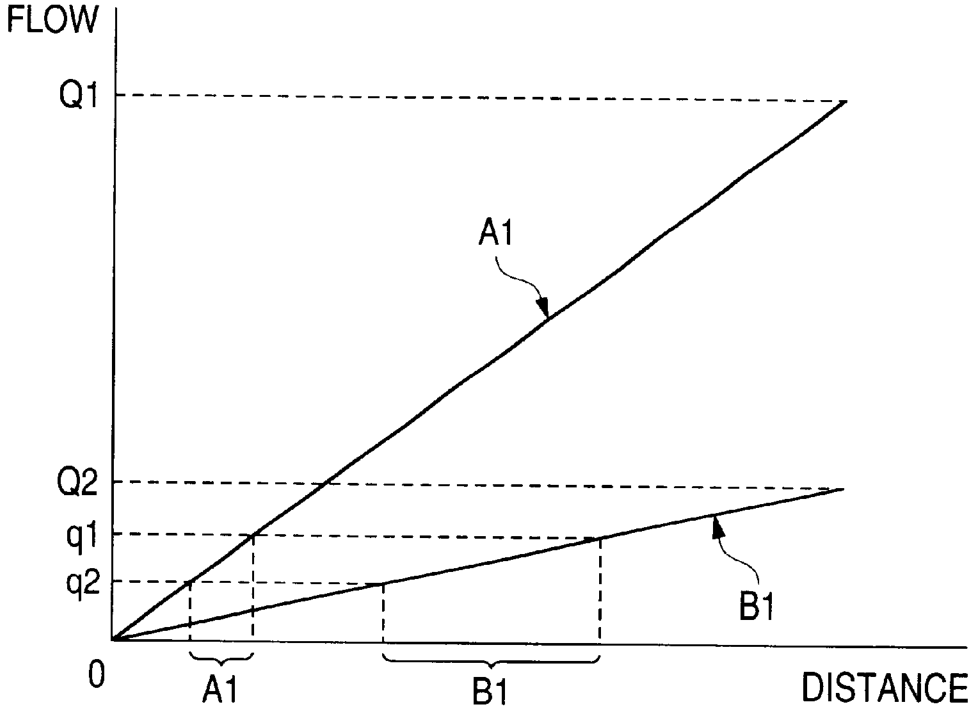
FIG. 5 shows a graph showing the relation between a distance when stepping on an operating pedal and a flow before a maximum flow is decreased and the relation between the distance and the flow after the maximum flow is decreased.
Figure 6:
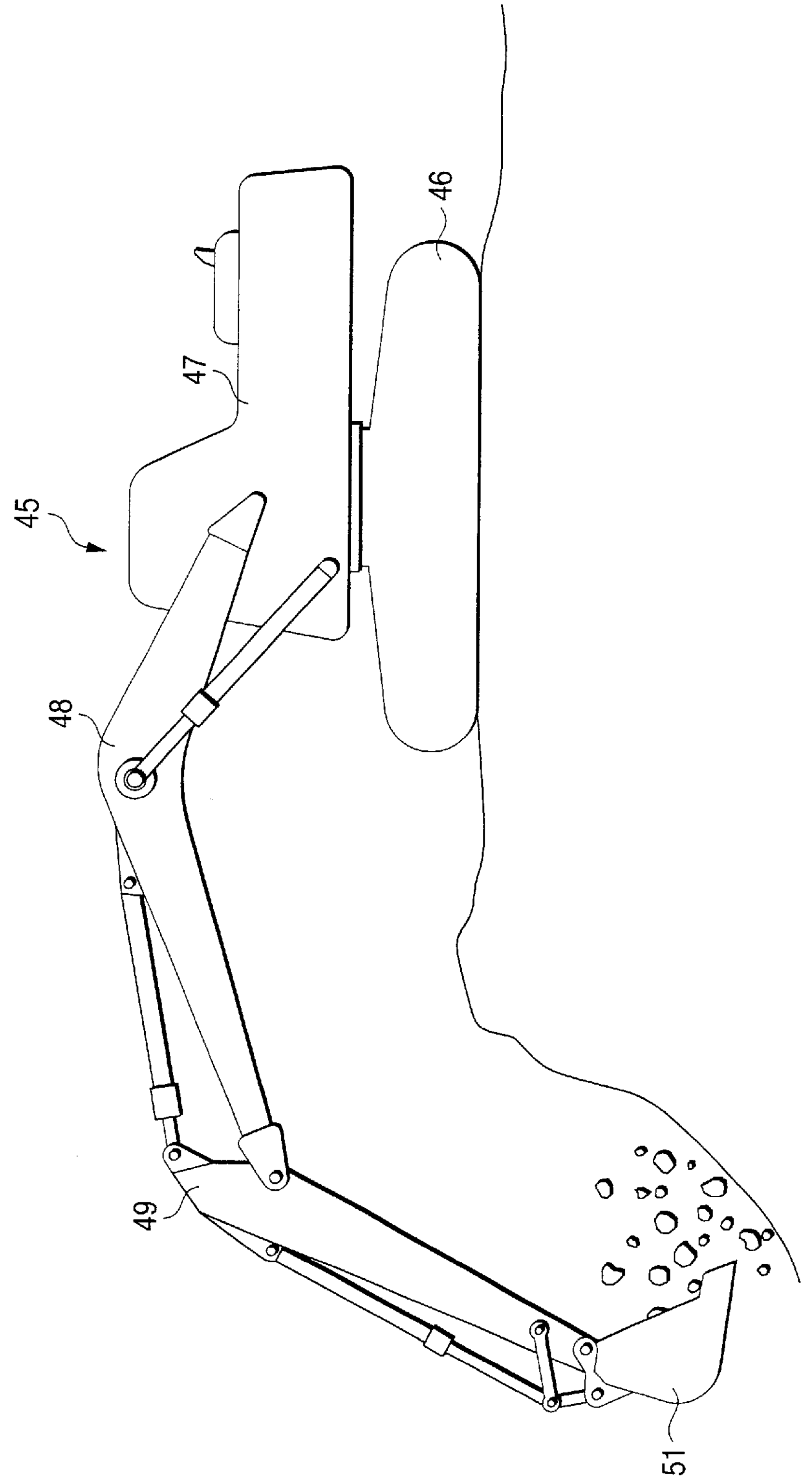
FIG. 6 PRIOR ART
FIG. 6 is a schematic entire view of the hydraulic shovel.

Referring to FIG. 5, the relation between the maximum distance of the operating pedal 11 and the flow when the maximum flow is decreased will be described below. FIG. 5 shows the relation between the distance of the operating pedal and the flow before the maximum flow is decreased and the relation between the distance of the operating pedal and the flow after the maximum flow is decreased. The maximum flow before the maximum flow is decreased is designated by Q1. The relation between the distance of the operating pedal and the flow shows a relation illustrated by a chart A1. When the operation for setting the maximum flow to a small value is carried out, the maximum flow obtained when the operating pedal 11 is stepped on to its maximum distance is decreased from Q1 to Q2. The relation between the distance of the operating pedal and the flow after the maximum flow is decreased is shown by a chart B1. The inclination of the chart B1 is lower than that shown by the chart A1 representing the relation between the distance of the operating pedal and the flow before the maximum flow is decreased. The inclination representing the relation between the distance of the operating pedal and the flow descends, hence the coefficient of fluctuation of the flow from the second operating valve 6 relative to the coefficient of fluctuation of the distance of the operating pedal 11 is decreased, leading to the improvement of the operation efficiency of the operating pedal 11. For example, when the flow is adjusted within a range from q1 to q2 as shown in FIG. 5, the adjustment range of the distance of the operating pedal 11 is located in A1 before the maximum flow is decreased. On the other hand, the adjustment range of the distance of the operating pedal 11 is widened to A2 after the maximum flow is decreased so that the operation efficiency of the operating pedal 11 can be improved.

In the next place, the operating for increasing and/or decreasing the maximum flow will be described below. A flow adjust screen is selected by the select button of the monitor device. On the monitor screen, the flow adjust screen is displayed (see the lower monitor screen shown in FIG. 4(A)). While viewing the flow adjust screen, the maximum flow can be adjusted step by step (for instance, 10 steps). The maximum flow is increased and/or decreased by the increase and/or decrease button to be adjusted to a necessary maximum flow. Then, the maximum flow is determined by pressing the determination button. The increase and/or decrease signal of the determined maximum flow is transmitted to the controller 19 and the command is sent to the solenoid control valve 12 from the controller 19. Thus, the pressure guided to the pilot pressure supply line 13 is increased and/or decreased by the solenoid control valve 12 so that the pressure exerted on the second pressure reducing part 1*a* is increased and/or decreased. Thus, pilot pressure exerted on the second pilot chamber 6*a* of the second operating valve 6 is increased and/or decreased in proportion to the pressure exerted on the second pressure reducing part 11*a*. The increase and/or decrease of the pilot pressure make it possible to increase and/or decrease the opening of the operating valve 6 corresponding to the distance of the operating pedal 11 and to increase and/or decrease the maximum flow obtained when the operating pedal 11 is stepped on to its maximum distance. The maximum flow is increased and/or decreased, so that an optimum maximum flow can be set to a different kind of breaker 10, the exhaust loss of unnecessary flow can be decreased, the power efficiency can be enhanced and energy can be saved.

Further, at this time, the switching or changing-over operation of one pump and two pumps is carried out by the flow combining and separating valve 3. An amount of discharge only of the hydraulic pump 2 is necessary at this time.

The switching or changing-over operation of one pump/two pumps will be described below. In the hydraulic shovel, the flow required for driving the breaker 10 is extremely lower than the flow required for the working machine cylinder 8. In order to drive the working machine cylinder 8, a large amount of discharge is required by driving the two hydraulic pumps including the first hydraulic pump 1 and the second hydraulic pump 2. However, in order to drive the breaker 10, a small amount of discharge maybe required. Therefore, the a mount of discharge from the two hydraulic pumps is not needed for the breaker 10. The first hydraulic pump 1 is combined with the hydraulic pump 2 through the flow combining and separating valve 3 and connected to the main discharge line 4. Accordingly, when the working machine cylinder 8 is driven, a large amount of discharge provided by the amount of discharge from the two hydraulic pumps including the first hydraulic pump 1 and the second hydraulic pump 2 is supplied to the main discharge line 4. On the other hand, when the breaker 10 is driven, the flow combining and separating valve 3 is switched so that the amount of discharge only from the second hydraulic pump 2 is needed and the amount of discharge is reduced. In such a manner, the amount of discharge of a plurality of hydraulic pumps 1 and 2 can be ensured depending on an attachment.

Further, at this time, the switching or changing-over operation for switching the single-acting hydraulic circuit and the double-acting hydraulic circuit is carried out by the change-over valve 21 in accordance with a command from the controller 19. Thus, the hydraulic circuit of the breaker 10 becomes the single-acting hydraulic circuit. Since the hydraulic circuit of the breaker becomes the single-acting hydraulic circuit, hydraulic oil entering from one port of the actuator of the breaker 10 flows out from the other port of the actuator and is directly returned to the tank without returning to the first operating valve 6 from the change-over valve 21. Therefore, back pressure is lowered so that the attachment can be smoothly driven.

Now, an operation required when a work by the crusher is carried out in the special kind of work and the work by the attachment will be described below. When the work by using the crusher is carried out, since the flow necessary for the work by the crusher is more than the flow necessary for the work by the breaker, the maximum flow obtained when the operating pedal is stepped on to its maximum distance needs to be preset so as to be more than that when the work by the breaker is carried out. Further, the flow necessary for the crusher 20 is different dependent on its manufacturer or its model. If the maximum flow is more than the necessary flow, the exhaust loss of the unnecessary flow will be undesirably increased. Therefore, it is also necessary to preset a maximum flow so as to meet a different kind of crusher 20. Thus, the operation for increasing and/or decreasing the maximum flow during the work by the crusher needs the operation for setting the maximum flow to a larger value and the maximum flow increasing and/or decreasing operation for increasing and/or decreasing the maximum flow step by step within a range of the set maximum flow.

Firstly, the operation for setting the maximum flow to a larger value will be described below. The mode A is selected by the attachment select switch of the monitor device 18 in the operating room. Then, A is displayed on the left and upper part of the monitor screen (see the upper monitor screen shown in FIG. 4(B)). A select signal is transmitted to the controller 19 and a command is sent to the solenoid control valve 12 from the controller 19. Pressure guided to the pilot pressure supply line 13 is set to be higher than that during the work by the breaker by the solenoid control valve 12. The pressure guided to the pilot pressure supply line 13 is pressure exerted on the second pressure reducing part 11*a*, hence the pressure exerted on the second pressure reducing part 11*a* is higher than that upon work by the breaker. Pilot pressure acting on the second pilot chamber 6*a* of the second operating valve 6 is increased in proportion to the pressure exerted on the second pressure reducing part 11*a*. The opening of the second operating valve 6 corresponding to the distance of the operating pedal is increased more than that when the work by the breaker is carried out. Therefore, the maximum flow obtained when the operating pedal 11 is stepped on to its maximum distance is increased more than that obtained when the work by the breaker is conducted.

Secondly, the maximum flow increasing and/or decreasing operation will be described below. A selection screen is selected by the select button of the monitor screen. On the monitor screen, a plurality of work modes as the selection screens (for instance, four modes of special works and one mode of a work by the crusher) are displayed (see the lower and left monitor screen shown in FIG. 4(B)). When the work by the crusher is selected from the plural work modes and the determination button is pressed, a flow adjust screen is superposed on the selected screen and displayed (see the lower and right monitor screen shown in FIG. 4(B)). An operation similar to the maximum flow increasing and/or decreasing operation in the work by using the breaker is carried out on the flow adjust screen, so that the maximum flow can be adjusted step by step (for instance, 10 steps). The increase and/or decrease of the maximum flow make it possible to set an optimum maximum flow to a different kind of crusher 20, to decrease the exhaust loss of unnecessary flow, to enhance the power efficiency and to save energy.

Further, at this time, the switching or changing-over operation of the one pump/the two pumps is carried out, and an amount of discharge from the two pumps of the first hydraulic pump 1 and the second hydraulic pump 2 is obtained so that an amount of discharge required for the work by the crusher can be ensured. Still further, the switching or changing-over operation for switching or changing over the single-acting hydraulic circuit and the double-acting circuit is carried out, and accordingly, the hydraulic circuit of the crusher 20 becomes the double-acting hydraulic circuit.

Although the specific embodiment of the hydraulic oil flow controller for the construction machine is described above, it is to be understood that the present invention is not limited to the above-described embodiment, and various modifications maybe made within a scope of the present invention. For example, although the relation of the distance of the operating pedal and the flow from the operating pedal shows the relation of a linear function in the above-described embodiment, the distance and the flow may not establish the relation of the linear function. Further, in the above-described embodiment, although the flow control specially suitable for the work by the breaker among the works using the attachments is explained, it is to be noted that this flow control may be applied to a flow control suitable for works by other attachments.

What is claimed is:

1. A hydraulic oil flow controller for a construction machine comprising an operating valve for supplying hydraulic oil from hydraulic pumps, to the actuator of an attachment of; an attachment operating unit for transmitting a pilot signal corresponding to a manipulated variable to the operating valve and a solenoid control valve for changing the flow characteristics of the pilot signal in accordance with a command from a controller, wherein an increase and/or decrease signal is sent to the solenoid control valve through the controller from a monitor device so that the flow of the hydraulic oil supplied to the actuator of the attachment is increased and/or decreased and the flow determined by the increase and/or decrease signal is displayed on a monitor screen.

2. A hydraulic oil flow controller for a construction machine according to claim 1, wherein the increase and/or decrease signal is transmitted to the controller by an increase and/or decrease switch provided on the monitor screen or in the vicinity of the monitor screen.

3. A hydraulic oil flow controller for a construction machine according to claim 2, further comprising a flow combining and separating valve for switching or changing over a plurality of hydraulic pumps, and a single hydraulic pump, wherein a select signal from a select switch is sent to the controller by an attachment select switch and the flow combining and separating valve is switched or changed over in accordance with the command from the controller.

4. A hydraulic oil flow controller for a construction machine according to claim 1, further comprising a flow combining and separating valve for switching or changing over a plurality of hydraulic pumps, and a single hydraulic pump, wherein a select signal from a select switch is sent to the controller by an attachment select switch and the flow combining and separating valve is switched or changed over in accordance with the command from the controller.

5. A hydraulic oil flow controller for a construction machine according to claim 4, further comprising a change-over valve for switching or changing over a single-acting hydraulic circuit and a double-acting hydraulic circuit, the change-over valve being switched or changed over by the attachment select switch.

6. A hydraulic oil flow controller for a construction machine comprising an operating valve for supplying hydraulic oil from hydraulic pumps to the actuator of an attachment of an attachment operating unit for transmitting a pilot signal corresponding to a manipulated variable to the operating valve and a solenoid control valve for changing the flow characteristics of the pilot signal in accordance with a command from a controller, wherein an increase and/or decrease signal is sent to the solenoid control valve through the controller from a monitor device so that the flow of the hydraulic oil supplied to the actuator of the attachment is increased and/or decreased and the flow determined by the increase and/or decrease signal is displayed on a monitor screen, further comprising;

a change-over valve for switching or changing over a single-acting hydraulic circuit and a double-acting hydraulic circuit, the change-over valve being switched or changed over by the attachment select switch.

7. A hydraulic oil flow controller for a construction machine comprising an operating valve for supplying hydraulic oil from hydraulic pumps to the actuator of an attachment of an attachment operating unit for transmitting a pilot signal corresponding to a manipulated variable to the operating valve and a solenoid control valve for changing the flow characteristics of the pilot signal in accordance with a command from a controller, wherein an increase and/or decrease signal is sent to the solenoid control valve through the controller from a monitor device so that the flow of the hydraulic oil supplied to the actuator of the attachment is increased and/or decreased and the flow determined by the increase and/or decrease signal is displayed on a monitor screen, wherein the increase and/or decrease signal is transmitted to the controller by an increase and/or decrease switch provided on the monitor screen or in the vicinity of the monitor screen, and further comprising;

a change-over valve for switching or changing over a single-acting hydraulic circuit and a double-acting hydraulic circuit, the change-over valve being switched or changed over by the attachment select switch.

* * * * *